United States Patent
Subramanian

(10) Patent No.: US 12,030,477 B2
(45) Date of Patent: Jul. 9, 2024

(54) REDUNDANT VEHICLE CONTROL SYSTEMS BASED ON TIRE SENSORS

(71) Applicant: Volvo Truck Corporation, Gothenburg (SE)

(72) Inventor: Chidambaram Subramanian, Greensboro, NC (US)

(73) Assignee: Volvo Truck Corporation, Gothenburg (SE)

(*) Notice: Subject to any disclaimer, the term of this patent is extended or adjusted under 35 U.S.C. 154(b) by 0 days.

(21) Appl. No.: 17/993,536

(22) Filed: Nov. 23, 2022

(65) Prior Publication Data

US 2023/0174029 A1    Jun. 8, 2023

(30) Foreign Application Priority Data

Dec. 2, 2021 (EP) .................................... 21212077

(51) Int. Cl.
*B60T 8/172* (2006.01)
*B60T 8/17* (2006.01)
*B60T 8/1761* (2006.01)

(52) U.S. Cl.
CPC .......... *B60T 8/1725* (2013.01); *B60T 8/1708* (2013.01); *B60T 8/1761* (2013.01);
(Continued)

(58) Field of Classification Search
CPC ...... B60T 8/1725; B60T 8/171; B60T 8/1708; B60T 8/1761; B60T 8/96; B60T 2240/00
See application file for complete search history.

(56) References Cited

U.S. PATENT DOCUMENTS 6,526,334 B1    2/2003  Latarnik et al.
6,650,986 B1 *  11/2003 Burgdorf .............. B60T 8/1725
                                                   701/70

(Continued)

FOREIGN PATENT DOCUMENTS

CN    103884293 A    6/2014
DE    102006057744 A    7/2008

(Continued)

OTHER PUBLICATIONS

Indian Patent Application No. 201841044001, filed Nov. 22, 2018, 13 pages.

(Continued)

*Primary Examiner* — George C Jin
(74) *Attorney, Agent, or Firm* — Withrow & Terranova, PLLC

(57) ABSTRACT

A motion control system for controlling one or more torque generating devices on a heavy-duty vehicle, the system comprising a primary sensor system with a primary sensor control unit configured to interpret an output signal of the primary sensor system, one or more tire sensor devices mounted on, in, or in connection to, one or more tires of the heavy-duty vehicle, and a tire sensor control unit configured to interpret an output signal of the one or more tire sensor devices, wherein the motion control system is arranged to base motion control of the heavy-duty vehicle on output data of the tire sensor control unit in case of malfunction in the primary sensor system and/or in the primary sensor control unit, and on output data of the primary sensor control unit otherwise.

13 Claims, 6 Drawing Sheets

(52) U.S. Cl.
CPC ....... *B60T 2240/00* (2013.01); *B60T 2250/04* (2013.01); *B60T 2270/10* (2013.01)

(56) References Cited

U.S. PATENT DOCUMENTS

| | | | |
|---|---|---|---|
| 6,754,615 | B1 | 6/2004 | Germann et al. |
| 9,311,761 | B1 | 4/2016 | Ye et al. |
| 9,776,462 | B1 | 10/2017 | Gray |
| 2003/0109968 | A1 | 6/2003 | Hessmert et al. |
| 2003/0144786 | A1 | 7/2003 | Hessmert et al. |
| 2003/0164036 | A1 | 9/2003 | Giustino |
| 2005/0097949 | A1 | 5/2005 | Hillenmayer et al. |
| 2005/0188754 | A1 | 9/2005 | Ogawa |
| 2008/0177498 | A1 | 7/2008 | Djama |
| 2008/0208515 | A1 | 8/2008 | Djama |
| 2008/0243335 | A1 | 10/2008 | Rao et al. |
| 2008/0296106 | A1 | 12/2008 | Nilsson |
| 2009/0231115 | A1 | 9/2009 | Tanaka |
| 2013/0035834 | A1 | 2/2013 | Couch et al. |
| 2014/0278040 | A1 | 9/2014 | Singh et al. |
| 2015/0005982 | A1 | 1/2015 | Muthukumar et al. |
| 2016/0009259 | A1* | 1/2016 | Joyce .................. B60T 8/88 701/70 |
| 2016/0121870 | A1 | 5/2016 | Bennett |
| 2016/0214585 | A1* | 7/2016 | Keller ................ B60C 23/0488 |
| 2017/0113499 | A1 | 4/2017 | Singh |
| 2017/0166215 | A1 | 6/2017 | Rander |
| 2017/0174193 | A1 | 6/2017 | Kirkpatrick et al. |
| 2017/0182999 | A1* | 6/2017 | Lai ...................... B60W 10/00 |
| 2017/0246915 | A1 | 8/2017 | Besnoin et al. |
| 2017/0357887 | A1 | 12/2017 | Wei et al. |
| 2018/0229560 | A1 | 8/2018 | DeCia et al. |
| 2018/0244159 | A1 | 8/2018 | Satterthwaite et al. |
| 2019/0168549 | A1* | 6/2019 | Kanbayashi .......... B60T 8/1725 |
| 2019/0187026 | A1 | 6/2019 | Uhrich et al. |
| 2019/0315169 | A1 | 10/2019 | Rogness et al. |
| 2019/0366782 | A1 | 12/2019 | Milburn, Jr. et al. |
| 2020/0231010 | A1 | 7/2020 | Carpenter et al. |
| 2021/0213935 | A1 | 7/2021 | Lu et al. |
| 2021/0284121 | A1* | 9/2021 | Lee ......................... G01P 3/00 |
| 2021/0284127 | A1 | 9/2021 | McKeown et al. |

FOREIGN PATENT DOCUMENTS

| | | |
|---|---|---|
| DE | 112017000906 T5 | 10/2018 |
| EP | 2157002 A1 | 2/2010 |
| EP | 2774784 A1 | 9/2014 |
| EP | 3689699 A1 | 8/2020 |
| EP | 3851346 A1 | 7/2021 |
| WO | 2017018700 A1 | 2/2017 |
| WO | 2018234651 A1 | 12/2018 |
| WO | 2019127506 A1 | 7/2019 |
| WO | 2020081977 A1 | 4/2020 |

OTHER PUBLICATIONS

Pacejka, H., "Tire and Vehicle Dynamics," 2012, Elsevier Ltd., 629 pages.
Extended European Search Report for European Patent Application No. 21212077.8, mailed May 18, 2022, 7 pages.
Indian Patent Application No. 20184104400, filed May 22, 2020, 13 pages.
Extended European Search Report for European Patent Application No. 21212078.6, mailed May 20, 2022, 8 pages.

* cited by examiner

REDUNDANT VEHICLE CONTROL SYSTEMS BASED ON TIRE SENSORS

RELATED APPLICATIONS

The present application claims priority to European Patent Application No. 21212077.8, filed on Dec. 2, 2021, and entitled "REDUNDANT VEHICLE CONTROL SYSTEMS BASED ON TIRE SENSORS," which is incorporated herein by reference in its entirety.

TECHNICAL FIELD

The present disclosure relates to methods and systems for controlling motion of heavy-duty vehicles, and in particular to redundant systems able to provide at least a rudimentary control function despite malfunction of one or more vehicle components. The invention can be applied in heavy-duty vehicles, such as trucks and construction equipment, but is not restricted to this particular type of vehicle.

BACKGROUND

Most heavy-duty vehicles comprise one or more vehicle control units (VECU) arranged to assist the driver in maneuvering the vehicle, e.g., as part of an advanced driver assistance system (ADAS). Autonomous or semi-autonomous vehicles of course rely to a great extent on VECUs for vehicle motion control.

For instance, VECU controlled anti-lock braking systems (ABS) step in to assume control in case one or more of the wheels of the vehicle lock during braking. Similarly, a traction control system (TCS), also known as ASR (from German: Antriebsschlupfregelung), assumes control in case the wheels of the vehicle spin out of control during acceleration. TCS is typically part of the overall electronic stability control (ESC) on a heavy-duty vehicle, which relies on one or more VECUs to provide more stable vehicle operation.

Strict safety requirements are often imposed on heavy-duty vehicles, and in particular on autonomous vehicles, such as level four (L4) and level five (L5) autonomous vehicles. Heavy-duty vehicles are therefore normally required to implement both redundant control and actuation systems, meaning that at least one back-up system should be possible to activate in order to provide at least a rudimentary control function in case one or more primary vehicle control systems suffer malfunction or some form of outage.

One option for implementing redundancy in a heavy-duty vehicle is to simply deploy two or more of every important component and system in the vehicle, however, this approach can be very costly and will take up valuable space which could otherwise be used for value-adding features such as extra battery capacity in an electric vehicle. Designing, for example, two separate and independent braking systems by simply multiplying the components is inefficient in terms of packaging, function performance, and system performance.

There is a need for more efficient ways of providing redundancy in a heavy-duty vehicle. In particular, there is a need for redundant vehicle sensor systems and control units configured to interpret the output signals from the redundant vehicle sensors in a robust manner for redundancy purposes.

SUMMARY

It is an object of the present disclosure to provide redundant motion control systems for heavy-duty vehicles. This object is at least in part obtained by a motion control system for controlling one or more torque generating devices on a heavy-duty vehicle. The system comprises a primary sensor system with a primary sensor control unit configured to interpret an output signal of the primary sensor system. The system also comprises one or more tire sensor devices mounted on, in, or in connection to one or more tires of the heavy-duty vehicle, and a tire sensor control unit configured to interpret an output signal of the one or more tire sensor devices. The motion control system is arranged to base motion control of the heavy-duty vehicle on output data of the tire sensor control unit in case of malfunction in the primary sensor system and/or in the primary sensor control unit, and on output data of the primary sensor control unit otherwise.

Thus, a redundant vehicle sensor system is provided based on smart tires, i.e., based on tire sensors and control units configured to interpret the output signals from the tire sensors. A vehicle motion management system may advantageously fall back to motion management based on the tire sensors in case of malfunction or other form of outage. The tire sensors do not take up space, being deployed in the tires and not, e.g., on the axles or chassis of the heavy-duty vehicle. The tire-mounted sensors may also be designed to be independent from the other sensor systems on the vehicle.

According to aspects, the primary sensor system comprises one or more wheel speed sensors, where the primary sensor control unit is configured to perform an anti-lock braking system (ABS) function. This way a low-cost, robust and efficient redundant control system including redundant sensors is provided for an ABS function of a heavy-duty vehicle. A similar set-up can be used to perform a traction control, (ASR) function, which is an advantage.

According to aspects, the one or more tire sensor devices comprises any of; an accelerometer, a strain gauge, and an optical sensor, wherein the output data of the tire sensor control unit comprises one or more wheel speed values. One or more of these sensor types can be used, depending on the application. The sensors are often low-cost yet reliable, which is an advantage.

According to aspects, the one or more tire sensor devices comprises a satellite positioning system receiver, wherein the output data of the tire sensor control unit comprises a vehicle speed over ground. the output data of the tire sensor control unit comprises a wheel slip ratio associated with a wheel on the heavy-duty vehicle. Thus, redundant means for estimating wheel slip is provided, which is an advantage.

According to aspects, the primary sensor control unit is configured to control a primary valve system for brake control of the heavy-duty vehicle, wherein the tire sensor control unit is configured to control a secondary valve system for brake control of the heavy-duty vehicle separate from the primary valve system. This way a redundant brake control system can be provided based on smart tire technology. The system is reliable and relatively low-cost. The tire sensors are separate and independent from the other vehicle sensor systems, which is an advantage.

According to aspects, the tire sensor control unit is configured to interpret the output signals of the one or more tire sensor devices based on a machine learning (ML) algorithm. Machine learning has been shown to provide efficient and stable signal processing functions suitable for use with tire sensor systems. Also, the ML algorithms can be trained to function with different types of tire sensors, and also using output data from two or more tire sensor types, which is an advantage since a more robust system is obtained. A physics guided ML algorithm can of course also be used.

The object is also obtained by a control system for controlling one or more torque generating devices on a heavy-duty vehicle. The system comprises a primary sensor system with a primary sensor control unit configured to interpret an output signal of the primary sensor system, wherein the primary sensor control unit is configured to determine a first load value associated with the heavy-duty vehicle, i.e., a normal force acting on one or more wheels of the heavy-duty vehicle. The system also comprises one or more tire sensor devices mounted on one or more tires of the heavy-duty vehicle, and a tire sensor control unit configured to interpret an output signal of the one or more tire sensor devices, wherein the tire sensor control unit is configured to determine a second load value associated with the heavy-duty vehicle. The control system is arranged to base control of the heavy-duty vehicle on the second load value in case of malfunction in the primary sensor system and/or in the primary sensor control unit, and on the first load value otherwise. Again, a redundancy system is provided based on tire sensor technology which does not take up valuable space on the axles or the chassis of the heavy-duty vehicle. The tire sensor systems can be designed to be independent from the other vehicle sensor systems, which is an advantage if the tire sensors are to be used as a redundant system.

According to aspects, the primary sensor system comprises a sensor configured in connection to a suspension system of the heavy-duty vehicle. The suspension system is normally used to estimate vehicle load. The tire sensors provide a redundant sensor system to complement such suspension-based load estimation systems. The one or more tire sensor devices comprises any of; an accelerometer, a strain gauge, and an optical sensor, wherein the output data of the tire sensor control unit comprises the second load value. These sensor types can be designed separately from the suspension, thereby providing an independent sensor system advantageously used for redundancy purposes.

According to aspects, the primary sensor control unit is configured to control a primary valve system for brake control of the heavy-duty vehicle, wherein the tire sensor control unit is configured to control a secondary valve system for brake control of the heavy-duty vehicle separate from the primary valve system. This way a redundant brake control system can be provided based on smart tire technology. The system is reliable and relatively low-cost. The tire sensors are separate and independent from the other vehicle sensor systems, which is an advantage.

According to aspects, the tire sensor control unit is configured to interpret the output signals of the one or more tire sensor devices based on a machine learning (ML) algorithm. Machine learning has been shown to provide efficient and stable signal processing functions suitable for use with tire sensor systems. Also, the ML algorithms can be trained to function with different types of tire sensors, and also using output data from two or more tire sensor types, which is an advantage since a more robust system is obtained. A physics guided ML algorithm can of course also be used.

According to aspects, the output data of the tire sensor control unit comprises a wheel slip ratio associated with a wheel on the heavy-duty vehicle. Thus, a redundant wheel-slip based control system is provided, which is an advantage.

There is also disclosed herein control units, computer programs, computer readable media, computer program products, brake systems, propulsion systems, methods and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION

Figure 1A:
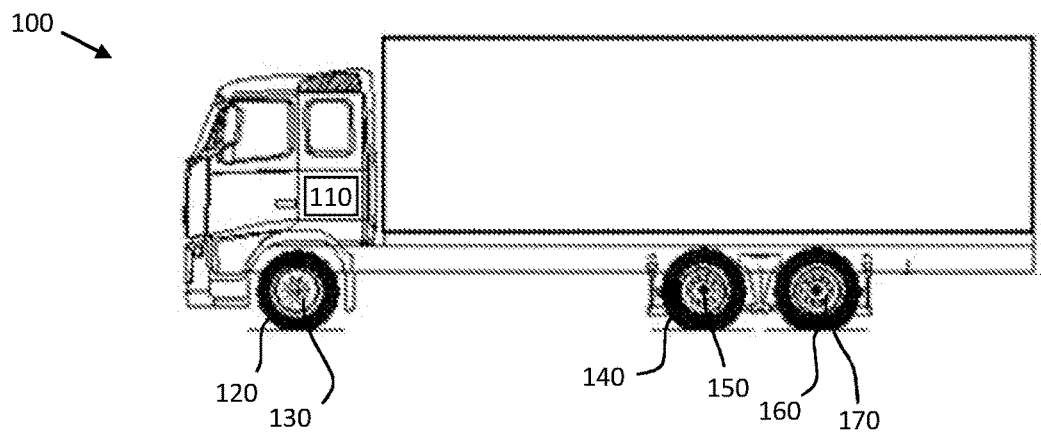
FIGS. 1A-B schematically illustrate some example heavy-duty vehicles.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Figure 1B:
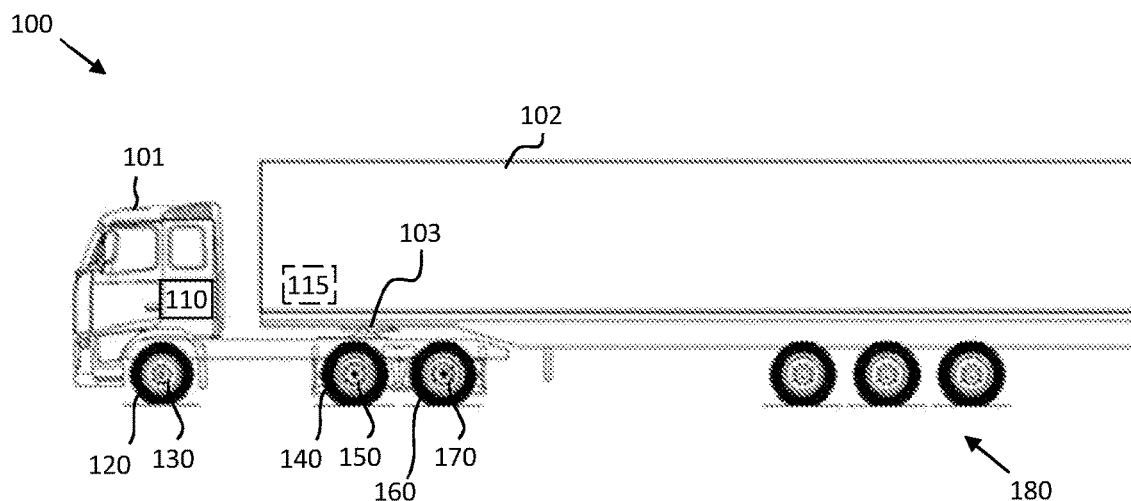

FIGS. 1A and 1B illustrate example vehicles 100 for cargo transport where the herein disclosed techniques can be applied with advantage. FIG. 1A shows a truck supported on wheels 120, 140, and 160, at least some of which are driven wheels and at least some of which are braked wheels.

FIG. 1B shows a semitrailer vehicle where a tractor unit 101 tows a trailer unit 102. The front part of the trailer unit 102 is supported by a fifth wheel connection 103, while the rear part of the trailer unit 102 is supported on a set of trailer wheels 180.

Figure 2:
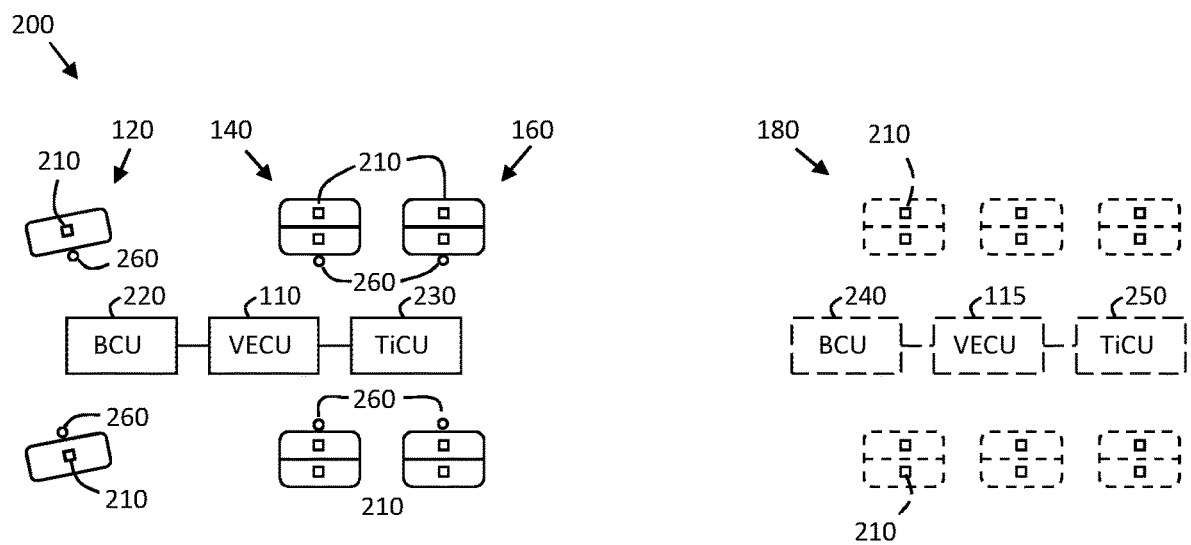
FIG. 2 shows an example redundant vehicle brake/propulsion system.

With reference also to FIG. 2, each wheel, or at least a majority of the wheels on the vehicle, is associated with a respective wheel service brake 130, 150, 170 (trailer unit wheel brakes are not indicated in FIGS. 1A-1B). This wheel service brake may, e.g., be a pneumatically actuated disc brake or a drum brake, or an electromechanical brake. The wheel brakes are controlled by one or more primary brake control units (BCU) 220 via a brake control valve arrangement in a known manner. Herein, the terms brake controller, brake modulator, and wheel end module will be used interchangeably. They are all to be interpreted as a device which controls applied braking force on at least one wheel of a vehicle, such as the vehicle 100. Each of the wheel brake controllers is communicatively coupled to a vehicle control unit (VECU) 110, allowing the control unit to communicate with the brake controllers, and thereby control vehicle braking. This control unit may potentially comprise a number of sub-units distributed across the vehicle, or it can be a single physical unit. The BCU may also be implemented as a software module which executes on the VECU hardware. The VECU 110 may, e.g., perform vehicle motion management functions such as allocating brake force between wheels to maintain vehicle stability and keep wheel slip at acceptable levels. The VECU 110 may also perform one or more vehicle state estimation functions, such as continuously or periodically estimating vehicle load, i.e., the normal force $F_z$ acting on one or more wheels of the vehicle 100. The VECU may also control one or more propulsion devices, i.e., a combustion engine and/or one or more electric machines. Torque generating devices such as service brakes and propulsion devices will be referred to herein as motion support devices (MSD). It is appreciated that a heavy-duty vehicle like those illustrated in FIG. 1A and in FIG. 1B may comprise a plurality of MSDs of different type.

Some trailers may also comprise a trailer VECU 115, often operating in slave configuration to the primary VECU 110. The trailer vehicle unit 102 may also comprise one or more BCUs 240 to control braking on the wheels 180 of the trailer. The trailer vehicle unit 102 may be a powered trailer vehicle unit which comprises propulsion devices in addition to the brake devices.

At least some of the wheels 120, 140, 160, and 180 comprise respective tire sensors 210. A tire sensor is a sensor device mounted in direct connection to the tire, such as inside the tire, embedded into the tire thread, or mounted on the wheel rim.

Many different types of tire sensors are known. Most tire sensors are based on accelerometers, various types of gauges (such as strain gauges), and optical devices. There are also tire sensors which comprise satellite positioning receivers that enable determination of vehicle speed. Some example tire sensors are described in the below list of prior art documents;

US2003164036 discloses methods for predicting the forces generated in the tire contact patch from measurements of tire deformations.
US2019187026 also relate to the determining of wheel forces using sensors mounted in connection to the tires of a vehicle. The disclosure also relates to the determination of wheel speed using sensors coupled to the wheel.
WO20081977A discusses tire sensors that may be configured to sense a magnitude of one or more physical quantities such as air pressure of the tire, contact patch area and/or shape, contact forces and adhesion characteristics of the road.
US2017113499 relates to estimating a tire state, such as its wear.
WO19127506A1 also relates to determining slip ratio of a tire based on data obtained from one or more sensors mounted in connection to a tire.
U.S. Pat. No. 6,526,334 relates to a tire sensing system configured to detect individual wheel loads as well as lateral and torsional forces applied to individual tires. In addition, the speeds of the individual wheels can be detected.

The present disclosure relates to techniques which exploit known tire sensor technology, such as that in the list above, in order to provide vehicle redundancy, in particular when it comes to sensor systems and control units for interpreting sensor output signals. For instance, in FIG. 2, the BCU 220, 240 may be part of a primary brake control system which comprises a primary sensor system based on, e.g., wheel speed sensors or the like, and a primary sensor control unit (the BCU) configured to interpret the output signals of the primary sensor system and control braking in dependence of a request from the VECU 110, 115 and based on the primary sensor system output signals. A tire sensor control unit (TiCU) is comprised in a secondary (redundant) brake control system which comprises one or more tire sensor devices 210 mounted on at least some of the tires 120, 140, 160, 180 of the heavy-duty vehicle 100. The TiCU 230, 250 is configured to interpret the output signals of the one or more tire sensor devices. The VECU 110, 115 may then base the vehicle control on the primary system as long as this system is up and running and deemed to provide reliable output, and fall back to the secondary system in case some form of malfunction is detected in the primary system. There are many known ways in which malfunction can be detected, e.g., based on a challenge response system, where malfunction is detected in case there is no response from the system in a pre-determined amount of time. Also, power outage may be used to infer that a malfunction has occurred. This way the vehicle 100 can be equipped with redundant control systems based on smart tires, i.e., tires comprising tire sensors and a tire sensor control unit, or TiCU 230, 250.

Unreliable data can also be seen as a form of malfunction. For instance, in case the vehicle experiences outage in a satellite-based positioning system.

It is appreciated that a redundancy system can be implemented in a trailer vehicle unit regardless of whether the tractor 101 comprises tire sensors, as also shown in FIG. 2, where a primary brake control system comprises a BCU 240 configured to operate based on data from a primary sensor system, and a TiCU forming part of the backup system, i.e., the secondary system which then bases its control on one or more tire sensors 210 assembled in connection to the tires and/or the wheels of the trailer vehicle unit 102.

Figure 3:
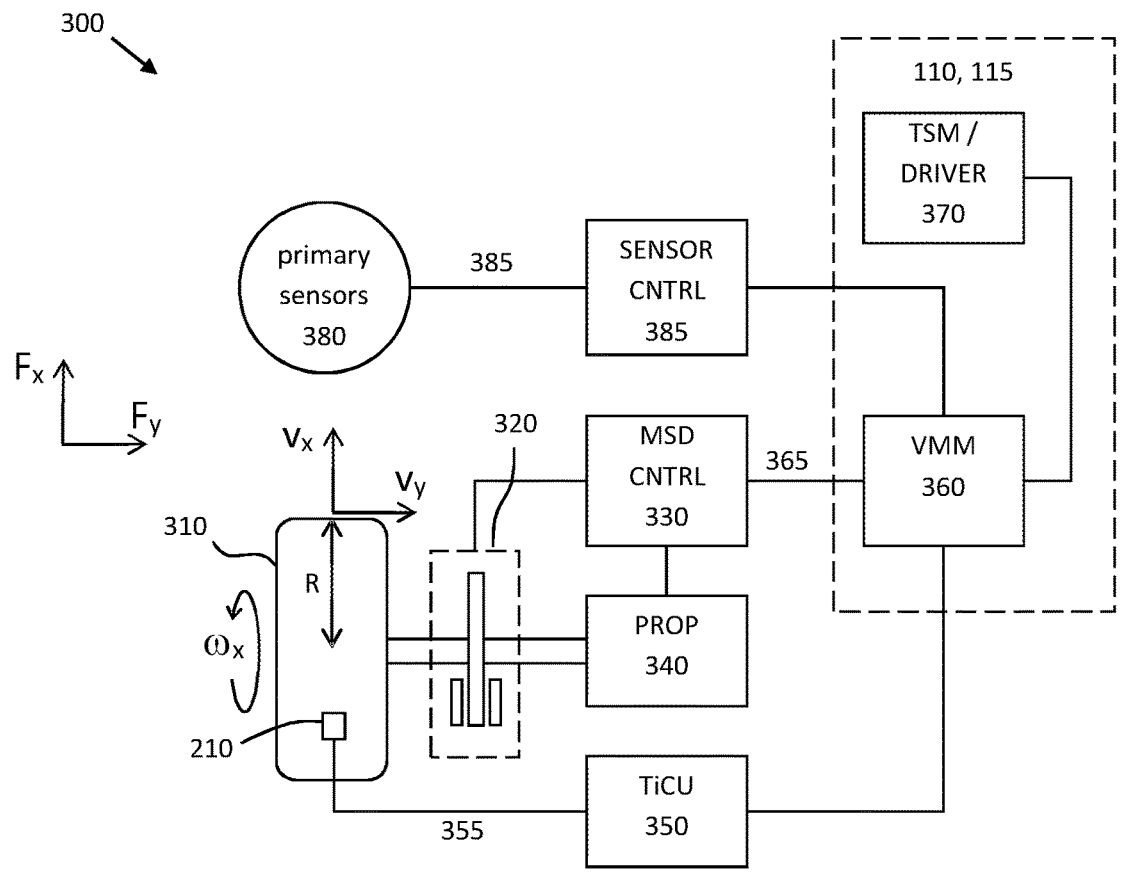
FIG. 3 shows an example vehicle control system comprising a tire sensor.

FIG. 3 schematically illustrates functionality 300 for controlling a wheel 310 by some example motion support devices (MSDs) here comprising a friction brake 320 (such as a disc brake or a drum brake) and a propulsion device 340 (such as an electric machine or a combustion engine). The friction brake 320 and the propulsion device 340 are examples of wheel torque generating devices, which may also be referred to as actuators and which can be controlled by one or more MSD control units 330. The control is based on, e.g., measurement data obtained from a wheel speed sensor and/or from other vehicle state sensors 380, such as radar sensors, lidar sensors, and also vision based sensors such as camera sensors and infra-red detectors. Other example torque generating motion support devices which may be controlled according to the principles discussed herein comprise engine retarders and power steering devices. An MSD control unit 330 may be arranged to control one or more actuators. For instance, it is not uncommon that an MSD control unit 330 is arranged to control both wheels on an axle.

A traffic situation management (TSM) function or a driver 370 plans driving operation with a time horizon of, e.g., 10 seconds or so. This time frame corresponds to, e.g., the time it takes for the vehicle 100 to negotiate a curve. The vehicle maneuvers, planned and executed by the TSM or by the driver, can be associated with acceleration profiles and curvature profiles which describe a desired vehicle velocity and turning for a given maneuver. The TSM continuously requests the desired acceleration profiles $a_{req}$ and curvature profiles $c_{req}$ from the VMM function 360 which performs force allocation to meet the requests from the TSM in a safe and robust manner. The VMM function 360 continuously feeds back capability information to the TSM function detailing the current capability of the vehicle in terms of, e.g., forces, maximum velocities, and accelerations which can be generated.

Figure 5:
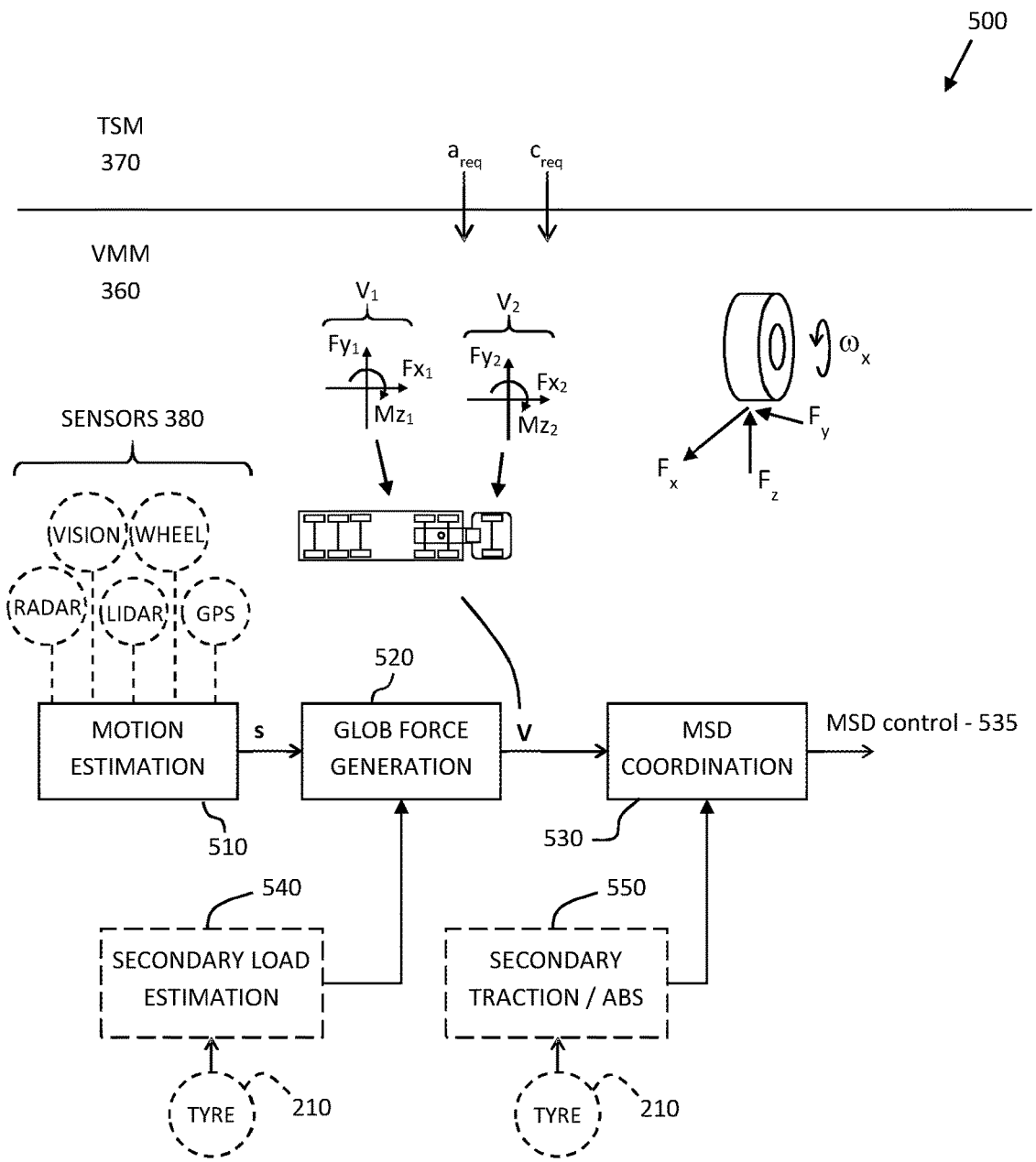
FIG. 5 shows an example vehicle control architecture.
Figure 5:
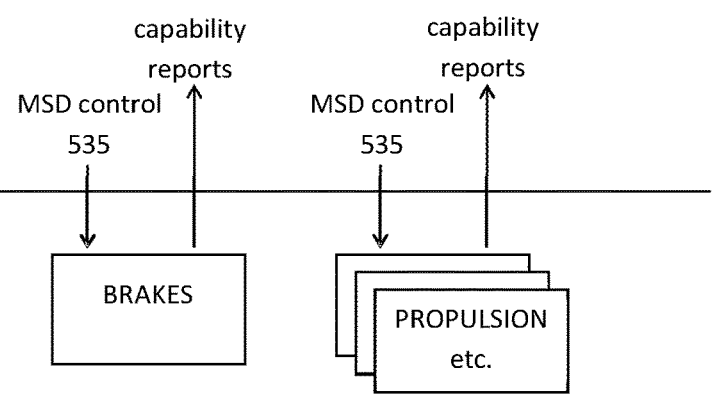

FIG. 5 illustrates an example of a vehicle control architecture comprising redundancy. The VMM function 360 in this architecture operates with a time horizon of about 1 second or so, and continuously transforms the acceleration profiles $a_{req}$ and curvature profiles $c_{req}$ into control commands for controlling vehicle motion functions, actuated by the different MSDs 320, 340 of the vehicle 100 which report back capabilities to the VMM, which in turn are used as constraints in the vehicle control. The VMM function 360 performs vehicle state or motion estimation 510, i.e., the VMM function 360 continuously determines a vehicle state s comprising positions, speeds, accelerations and articulation angles of the different units in the vehicle combination by monitoring operations using various sensors 380 arranged on the vehicle 100, often but not always in connection to the MSDs 320, 340.

The result of the motion estimation 510, i.e., the estimated vehicle state s, is input to a force generation module 520 which determines the required global forces $V=[V_1, V_2]$ for the different vehicle units to cause the vehicle 100 to move according to the requested acceleration and curvature profiles $a_{req}$, $c_{req}$. The required global force vector V is input to an MSD coordination function 530 which allocates wheel forces and coordinates other MSDs such as steering and suspension, and generates MSD control signals 535 which are then sent to the different MSD controllers 330. The coordinated MSDs then together provide the desired lateral Fy and longitudinal Fx forces on the vehicle units, as well as the required moments Mz, to obtain the desired motion by the vehicle combination 100.

FIG. 5 illustrates two redundant vehicle control systems, which can be used in combination or independently.

The first redundant system is a system for load estimation 540. This system comprises a load estimation module 540 configured to use one or more tire sensors 210 to determine vehicle load, which may comprise estimating tire normal forces $F_z$ at one or more wheels. The VMM 360 may then draw upon this input in case the primary load estimation system of the vehicle 100 malfunctions. Systems for load estimation using, e.g., signals obtained from suspension systems and from other sources are known and will therefore not be discussed in more detail herein.

Figure 9:
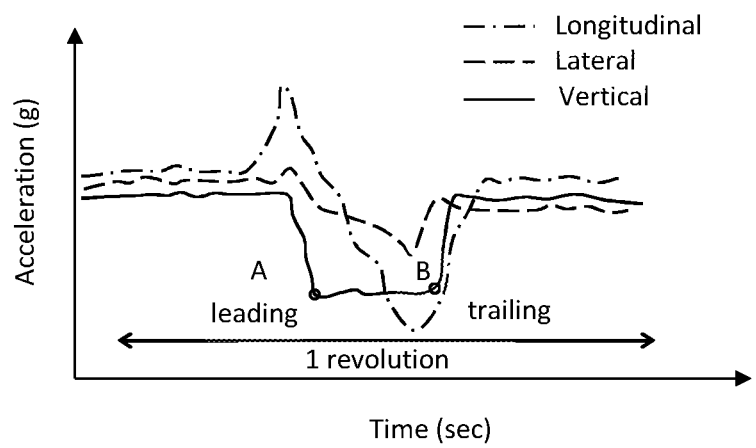
FIGS. 9-12 are graphs showing example tire sensor output signals.

An example of how a tire sensor 210 can be used to predict the load on a given wheel, i.e., a value associated with the normal force Fz acting on the tire, will now be discussed. With reference to FIG. 9, assuming an accelerometer sensor has been mounted in, on, or in connection to a tire 310. An example tire revolution reading from the accelerometer (lateral, longitudinal, and vertical coordinates) is schematically exemplified in FIG. 9. The points A and B are the leading edge and the trailing edge in the contact patch of the tire. If some other tire of sensor is used, similar waveforms would be generated depending on if its acceleration or velocity or position is measured, since they are related to each other. For example, using an optical sensor to measure tire deformation would provide the displacement in a similar fashion, and the second order derivative of the measured displacement would provide the acceleration of the sensor device.

Figure 10A:
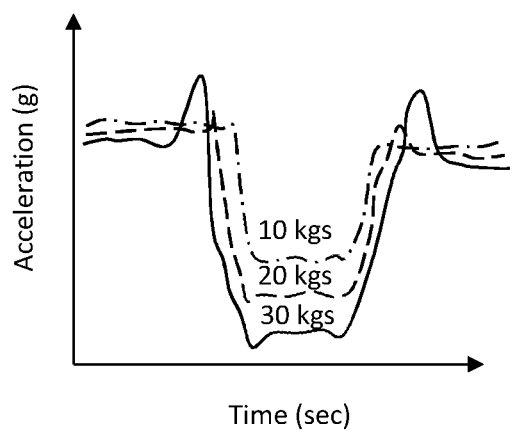
Figure 10B:
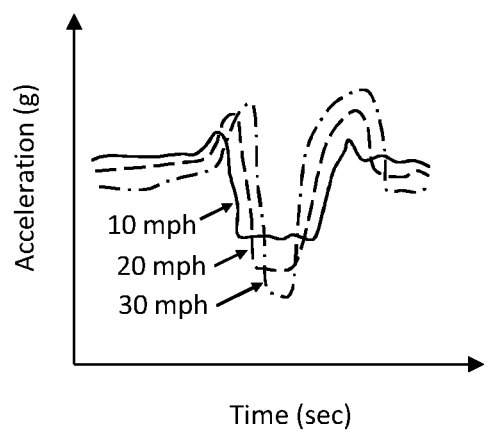

The algorithms for determining load on a tire can be categorized into three broad types of methods, Data driven machine learning (ML) based approaches
Physics based analytical approaches
Physics guided machine learning approaches In the Data driven ML based approach, a machine learning structure is trained using, e.g., tire Pressure, tire load, and road surface properties. The truth labelling or training data used during training presents example sensor output signals for a range of different tire loads, and the ML structure then adapts to be able to predict tire load based on the tire sensor output signal. The ML training may be performed off-line and/or on-line, perhaps based on output from a primary load estimation system, such as a suspension-based system. The above features are chosen since they are the most sensitive parameters for the generated wave form out from the sensor. This ML model for estimating the load would be developed through a large amount of data at different operating conditions (different loads, velocity, tire pressure, road surface). An example of the curve's dependency on speed and load is schematically illustrated in FIG. 10A and FIG. 10B. As noticed, as the load increases the leading and trailing edge move away from each other with higher amplitude in the signal. Also, as velocity increases the amplitude increases but the leading and trailing edge tends to come closer to each other. The artificial intelligence (AI) structure or the ML algorithm can determine the normal load in this manner using conventional training techniques.

In the case of physics based analytical approaches, with the help of road inclination angle and suspension movements, it is possible to quantify the road profile. Using this data, an inverse tire model as discussed above can be generated using a complete physics-based approach to determine what would be the load under the tire for that level of acceleration and/or velocity and or displacement.

The physics guided ML approaches can be implemented as a mixture of the data driven ML based approach and the physics based analytical approach. Assuming there is an accurate inverse tire model available, it is possible to use that value in the ML training function or use it with a reinforcement learning model for a neural network to train on the fly using the physics-based approach in the error function for training the algorithm. If there is no accurate inverse tire model available, then the ML structure could have tuneable parameters like tuneable Pacejka parameters and that could be tuned as we train the model containing that equation in the ML error function.

Assume an example truck with an air suspension system, where the load is estimated axle wise and not at individual wheel end. The brake force distribution function in the electronic braking system of the truck uses the axle load to determine the brake pressure distribution axle wise to meet the brake forces required. Usually on an unladen vehicle where the rear load is relatively small compared to front axle load, the pressure on the rear is reduced compared to the pressure on the front. This is to utilize the peak friction and avoid unnecessary/pre-mature rear wheel lock up and getting into ABS cycles.

When the primary load information has malfunctioned, the tire sensors would kick in and provide the load data thus maintaining a rudimentary function despite the primary system malfunction.

Further, this could also work in parallel for a L4 vehicle to determine individual wheel end loads and the primary system could do a comparison to this load info with the traditional air suspension load info and use one of the two based on confidence level and boundary conditions.

Tire sensors can also be used to determine slip ratio of a given wheel. Assuming that an accelerometer is used. An example tire revolution reading from the accelerometer was schematically shown in FIG. 9.

The points A and B are the leading edge and the trailing edge in the contact patch. The reading within A and B define the contact patch data. If another sensor is used, similar waveforms would be generated depending on if its acceleration/velocity/position since they are related to each other (derivatives). For example, using an optical sensor would provide the displacement in a similar fashion, the second order derivative would provide the acceleration.

Figure 11:
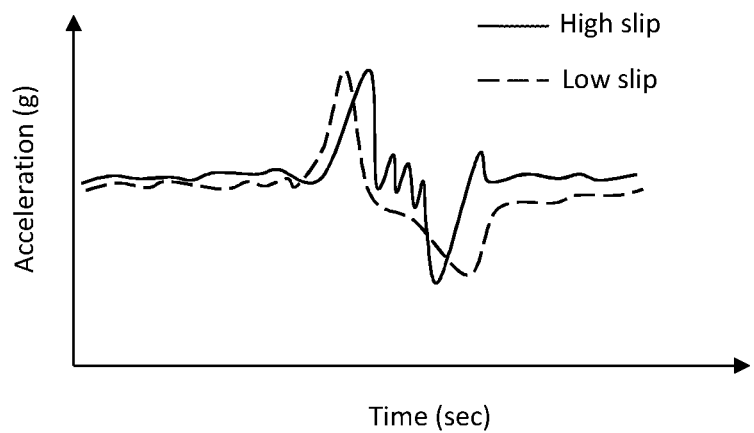

Direct ML blackbox training can be used to train the ML structure. In this methodology we use the during contact patch signal as shown in FIG. 11. FIG. 11 also shows the difference in the contact patch signal for different slip ratios. This signal along with lateral and vertical signal with the necessary features like load, surface, pressure, and velocity (since they affect the signal characteristics primarily, they need to be input features) would be provided to the ML structure. The high frequency in the figure in the during contact patch zone is observed only because of the slippage and the contact patch length would also change. Further, converting this signal to time domain using, e.g., a fast Fourier transform (FFT).

Figure 12:
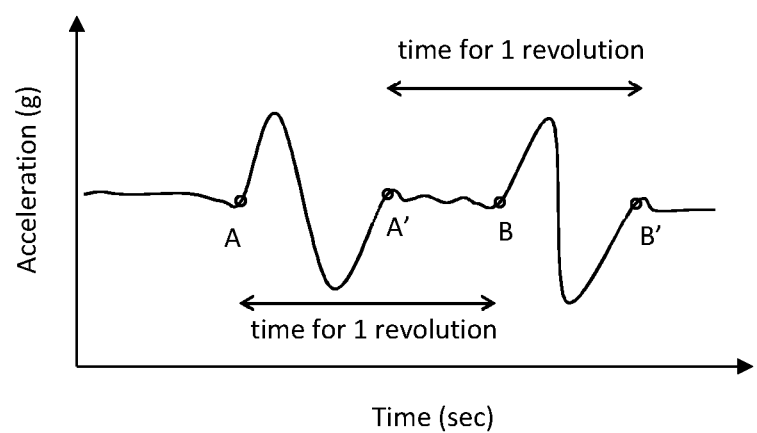

In another method, illustrated in FIG. 12, we would use the smart tire leading edge and trailing edge of one revolution to the next revolution to estimate the time taken. Knowing the circumference of the tire, this would provide accurate wheel speed information. This wheel speed information would be used in the generic formula replacing $R\omega_x$, $$\lambda = \frac{R\omega_x - v_x}{\max(|R\omega|, |v_x|)}$$

Similarly, the rolling radius R can be estimated through pure ML or through physics based approach using the leading and trailing edge points and. This info can be used in the same generic info replacing only R this time and using a from the wheel speed sensor.

Assuming we have a truck or other heavy-duty vehicle with an electronic braking system based on pneumatics. The primary system could control an electronic pressure modulator and the secondary system could control another electronic pressure modulator, both of these could lead to a Select high or Select Low double check valve before being connected to the wheel end. During a traction control event or antilock braking events or electronic stability program events, the primary system and secondary system could function together with the Select high or Select Low valve being in series allowing the correct pressure to flow to the wheel end. There could be fall back modes defined, only for certain faults, the secondary system would take control and provide necessary pressures out of the electronic pressure modulators that it is connected to.

In our case, during a traction control event, if there is a
 a. Wheel speed sensor failure or
 b. Primary control system ECU failure
 c. Primary control system ECU Memory malfunction (it has corrupted values for Tire radius or tone ring pole count)
 d. Absurd/out of range wheel slip values from primary ECU
 e. Drastic difference between left and right only for one axle There could be many more scenarios identified, our secondary control unit would kick in and take control for accurate slip-based traction control for the L4 vehicles. This would be a safety concern for ASR, ESP and ABS for L4 vehicles to have redundancy. If there is no redundancy, then the vehicle will have to be stopped since there are risks of jack knifing and losing stability. Even during stop and go, if the rear wheels slip, there is high chance of oversteer and thus the vehicle shall not operate with such failures.

To summarize, there is disclosed herein a control system 500 for controlling one or more torque generating devices 320, 340 on a heavy-duty vehicle 100, the system 300, 500 comprising a primary sensor system 380 with a primary sensor control unit 220, 385 configured to interpret an output signal 385 of the primary sensor system 380, wherein the primary sensor control unit 220, 385 is configured to determine a first load value associated with the heavy-duty vehicle 100, and one or more tire sensor devices 210 mounted on one or more tires 120, 140, 160, 180 of the heavy-duty vehicle 100, and a tire sensor control unit 350 configured to interpret an output signal 355 of the one or more tire sensor devices 210, wherein the tire sensor control unit 220, 385 is configured to determine a second load value associated with the heavy-duty vehicle 100, wherein the control system 500 is arranged to base control of the heavy-duty vehicle 100 on the second load value in case of malfunction in the primary sensor system 380 and/or in the primary sensor control unit 220, 385, and on the first load value otherwise.

The tire sensor system is independent from the primary sensor system, and therefore advantageously used for redundancy purposes. The output signals from the tire sensors can be used at least temporarily, e.g., in order to bring the heavy-duty vehicle to a full stop in case of malfunction in the primary sensor system. It is also an advantage that the tire sensors are mounted in, on, or in connection to the tires on the wheel, and not taking up valuable space on the axles of the vehicle or the scarce chassis space.

According to aspects, the primary sensor system 380 comprises a sensor configured in connection to a suspension system of the heavy-duty vehicle 100.

According to aspects, the one or more tire sensor devices 210 comprises any of; an accelerometer, a strain gauge, and an optical sensor, wherein the output data of the tire sensor control unit 350 comprises the second load value.

According to aspects, the tire sensor control unit 350 is configured to interpret the output signals 355 of the one or more tire sensor devices 210 based on a machine learning algorithm and or a physics guided machine learning algorithm, as discussed above.

According to aspects, the one or more tire sensor devices 210 comprises any of; an accelerometer, a strain gauge, and an optical sensor, wherein the output data of the tire sensor control unit 350 comprises one or more wheel speeds.

According to aspects, the one or more tire sensor devices 210 comprises a satellite positioning system receiver, wherein the output data of the tire sensor control unit 350 comprises a vehicle speed over ground.

According to aspects, the output data of the tire sensor control unit 350 comprises a wheel slip ratio associated with a wheel on the heavy-duty vehicle 100.

The second redundant system comprises a module 550 for traction control and/or anti-lock braking. This module also bases its operation on input data obtained from one or more tire sensors 210. If some crucial component, either a hardware component or a software component malfunctions, the secondary traction control system and/or the secondary ABS can step in and provide at least a rudimentary form of support, at least until the vehicle 100 can be brought to a full stop is a safe manner.

Consequently, there is also disclosed herein a motion control system 300, 500 for controlling one or more torque generating devices 320, 340 on a heavy-duty vehicle 100. The system 300, 500 comprises a primary sensor system 380 with a primary sensor control unit 220, 385 configured to interpret an output signal 385 of the primary sensor system 380, one or more tire sensor devices 210 mounted on one or more tires 120, 140, 160, 180 of the heavy-duty vehicle 100, and a tire sensor control unit 350 configured to interpret an output signal 355 of the one or more tire sensor devices 210. The motion control system 300, 500 is arranged to base motion control of the heavy-duty vehicle 100 on output data of the tire sensor control unit 350 in case of malfunction in the primary sensor system 380 and/or in the primary sensor control unit 220, 385, and on output data of the primary sensor control unit 220, 385 otherwise. Again, the tire sensor system on the heavy-duty vehicle is used to provide an independent and separate sensor system which can function as a back-up in case the primary sensor system on the heavy-duty vehicle fails for some reason.

According to aspects, the primary sensor system 380 comprises one or more wheel speed sensors, where the primary sensor control unit 220, 385 is configured to perform an anti-lock braking system, ABS, function.

According to aspects, the primary sensor system 380 comprises one or more wheel speed sensors, where the primary sensor control unit 220, 385 is configured to perform a traction control, ASR, function.

According to aspects, the one or more tire sensor devices 210 comprises any of; an accelerometer, a strain gauge, and an optical sensor, wherein the output data of the tire sensor control unit 350 comprises one or more wheel speeds.

According to aspects, the one or more tire sensor devices 210 comprises a satellite positioning system receiver, wherein the output data of the tire sensor control unit 350 comprises a vehicle speed over ground.

According to aspects, the output data of the tire sensor control unit 350 comprises a wheel slip ratio associated with a wheel on the heavy-duty vehicle 100.

According to aspects, the primary sensor control unit 220, 385 is configured to control a primary valve system for brake control of the heavy-duty vehicle 100, wherein the tire sensor control unit 350 is configured to control a secondary valve system for brake control of the heavy-duty vehicle 100 separate from the primary valve system.

According to aspects, the tire sensor control unit 350 is configured to interpret the output signals 355 of the one or more tire sensor devices 210 based on a machine learning algorithm.

According to aspects, the tire sensor control unit 350 is configured to interpret the output signals 355 of the one or more tire sensor devices 210 based on a physics guided machine learning algorithm.

By determining vehicle unit motion using, e.g., global positioning systems, vision-based sensors, wheel speed sensors, radar sensors and/or lidar sensors, and translating this vehicle unit motion into a local coordinate system of a given wheel 310 (in terms of, e.g., longitudinal and lateral velocity components), it becomes possible to accurately estimate wheel slip in real time by comparing the vehicle unit motion in the wheel reference coordinate system to data obtained from the wheel speed sensor arranged in connection to the wheel 310. Alternatively, a redundant system based on smart tires with tire sensors and a tire sensor control unit can be used to determine wheel slip accurately in real time.

A tire model, which will be discussed in more detail in connection to FIG. 4 below, can be used to translate between a desired longitudinal tire force $Fx_i$ for a given wheel i and an equivalent wheel slip $\square_i$ for the wheel. Wheel slip $\square$ relates to a difference between wheel rotational velocity and speed over ground and will be discussed in more detail below. Wheel speed $\square$ is a rotational speed of the wheel, given in units of, e.g., rotations per minute (rpm) or angular velocity in terms radians/second (rad/sec) or degrees/second (deg/sec).

Herein, a tire model is a model of wheel behavior which describes wheel force generated in longitudinal direction (in the rolling direction) and/or lateral direction (orthogonal to the longitudinal direction) as function of wheel slip. In "Tire and vehicle dynamics", Elsevier Ltd. 2012, ISBN 978-0-08-097016-5, Hans Pacejka covers the fundamentals of tire models. See, e.g., chapter 7 where the relationship between wheel slip and longitudinal force is discussed.

To summarize, in an example implementation of a vehicle control system 500, the VMM function 360 manages both force generation and MSD coordination, i.e., it determines what forces that are required at the vehicle units in order to fulfil the requests from the TSM function 370, or from a driver of the vehicle 100, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels.

The interface 365 between VMM and MSDs capable of delivering torque to the vehicle's wheels has, traditionally, been focused on torque based requests to each MSD from the VMM without any consideration towards wheel slip. However, this approach has significant performance limitations. In case a safety critical or excessive slip situation arises, then a relevant safety function (traction control, anti-lock brakes, etc.) operated on a separate control unit normally steps in and requests a torque override in order to bring the slip back into control. The problem with this approach is that since the primary control of the actuator and the slip control of the actuator are allocated to different electronic control units (ECUs), the latencies involved in the communication between them significantly limits the slip control performance. Moreover, the related actuator and slip assumptions made in the two ECUs that are used to achieve the actual slip control can be inconsistent and this in turn can lead to sub-optimal performance.

Significant benefits can be achieved by instead using a wheel speed or wheel slip based request on the interface 365 between VMM and the MSD controller or controllers 330, thereby shifting the difficult actuator speed control loop to the MSD controllers, which generally operate with a much shorter sample time compared to that of the VMM function. Such an architecture can provide much better disturbance rejection compared to a torque based control interface and thus improves the predictability of the forces generated at the tire road contact patch.

Longitudinal wheel slip λ may, in accordance with SAE J670 (SAE Vehicle Dynamics Standards Committee Jan. 24, 2008) be defined as $$\lambda = \frac{R\omega_x - v_x}{\max(|R\omega|, |v_x|)}$$

where R is an effective wheel radius in meters, $\omega_x$ is the angular velocity of the wheel, and $v_x$ is the longitudinal speed of the wheel (in the coordinate system of the wheel). Thus, λ is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel.

Since the wheel slip may be crucial for vehicle motion management, it becomes important to ensure that a reliable estimate of wheel slip is always available. The tire sensor based systems increase this reliability. The same is true for normal load, which plays an important part in, e.g., determining peak available wheel force, as will be discussed in connection to FIG. 4 below. The vehicle motion management systems discussed herein comprise redundant systems for estimating normal load, and can therefore function even if the primary load estimation system fails for some reason.

The VMM 360 and optionally also the MSD control unit 330 maintains information on $v_x$ (in the reference frame of the wheel), while a wheel speed sensor 380 or the like can be used to determine $\omega_x$ (the rotational velocity of the wheel).

In order for a wheel (or tire) to produce a wheel force, slip must occur. For smaller slip values the relationship between slip and generated force are approximately linear, where the proportionality constant is often denoted as the slip stiffness of the tire. A tire 310 is subject to a longitudinal force $F_x$, a lateral force $F_y$, and a normal force $F_z$. The normal force $F_z$ is key to determining some important vehicle properties. For instance, the normal force to a large extent determines the achievable lateral tire force $F_y$ by the wheel since, normally, $F_y \leq \mu F_z$, where μ is a friction coefficient associated with a road friction condition. The maximum available lateral force for a given lateral slip can be described by the so-called Magic Formula as described in "Tire and vehicle dynamics", Elsevier Ltd. 2012, ISBN 978-0-08-097016-5, by Hans Pacejka.

Figure 4:
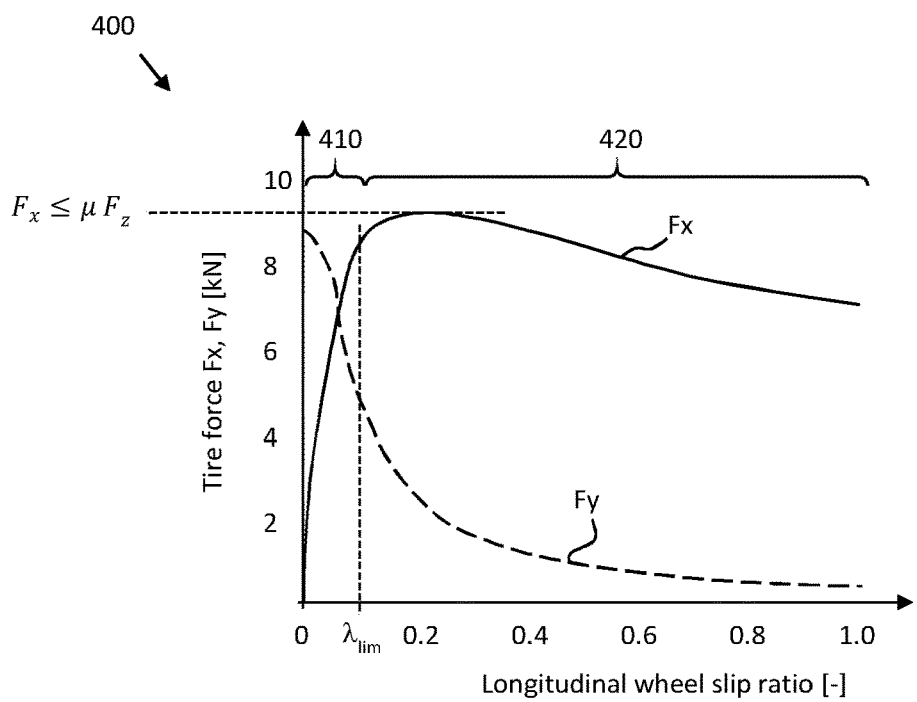
FIG. 4 illustrates a dependency between tire forces and wheel slip ratio.

FIG. 4 is a graph showing an example of achievable tire force as function of wheel slip. The longitudinal tire force Fx shows an almost linearly increasing part 410 for small wheel slips, followed by a part 420 with more non-linear behaviour for larger wheel slips. The obtainable lateral tire force Fy decreases rapidly even at relatively small longitudinal wheel slips. It is desirable to maintain vehicle operation in the linear region 410, where the obtainable longitudinal force in response to an applied brake command is easier to predict, and where enough lateral tire force can be generated if needed. To ensure operation in this region, a wheel slip limit $\square_{LIM}$ on the order of, e.g., 0.1, can be imposed on a given wheel. For larger wheel slips, e.g., exceeding 0.1, a more non-linear region 420 is seen. Control of a vehicle in this region may be difficult and is therefore often avoided. It may be interesting for traction in off-road conditions and the like where a larger slip limit for traction control might be preferred, but not for on-road operation.

This type of tire model can be used by the VMM 360 to generate a desired tire force at some wheel. Instead of requesting a torque corresponding to the desired tire force, the VMM can translate the desired tire force into an equivalent wheel slip (or, equivalently, a wheel speed relative to a speed over ground) and request this slip instead. The main advantage being that the MSD control device 330 will be able to deliver the requested torque with much higher bandwidth by maintaining operation at the desired wheel slip, using the vehicle speed $v_x$ and the wheel rotational velocity ox.

The VECU 110, 115 can be arranged to store a predetermined inverse tire model $f^{-1}$ in memory, e.g., as a look-up table. The inverse tire model is arranged to be stored in the memory as a function of the current operating condition of the wheel 310. This means that the behavior of the inverse tire model is adjusted in dependence of the operating condition of the vehicle, which means that a more accurate model is obtained compared to one which does not account for operating condition. The model which is stored in memory can be determined based on experiments and trials, or based on analytical derivation, or a combination of the two. For instance, the control unit can be configured to access a set of different models which are selected depending on the current operating conditions. One inverse tire model can be tailored for high load driving, where normal forces are large, another inverse tire model can be tailored for slippery road conditions where road friction is low, and so on. The selection of a model to use can be based on a pre-determined set of selection rules. The model stored in memory can also, at least partly, be a function of operating condition. Thus, the model may be configured to take, e.g., normal force or road friction as input parameters, thereby obtaining the inverse tire model in dependence of a current operating condition of the wheel 310. It is appreciated that many aspects of the operating conditions can be approximated by default operating condition parameters, while other aspects of the operating conditions can be roughly classified into a smaller number of classes. Thus, obtaining the inverse tire model in dependence of a current operating condition of the wheel 310 does not necessarily mean that a large number of different models need to be stored, or a complicated analytical function which is able to account for variation in operating condition with fine granularity. Rather, it may be enough with two or three different models which are selected depending on operating condition. For instance, one model to be used when the vehicle is heavily loaded and another model to be used otherwise. In all cases, the mapping between tire force and wheel slip changes in some way in dependence of the operating condition, which improves the precision of the mapping.

The inverse tire model may also be implemented at least partly as an adaptive model configured to automatically or at least semi-automatically adapt to the current operating conditions of the vehicle. This can be achieved by constantly monitoring the response of a given wheel in terms of wheel force generated in response to a given wheel slip request, and/or monitoring the response of the vehicle 100 in response to the wheel slip requests. The adaptive model can then be adjusted to more accurately model the wheel forces obtained in response to a given wheel slip request from a wheel.

Figure 6A:
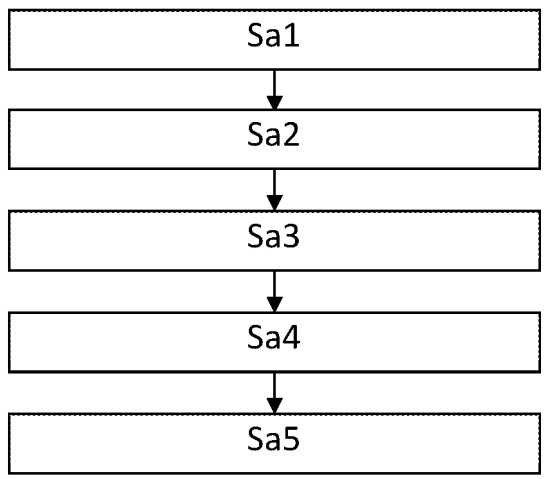
FIGS. 6A-B are flow charts illustrating methods.

FIG. 6A is a flow chart illustrating a method which summarizes some of the techniques discussed above. There is illustrated a computer implemented method performed by a motion control system 300, 500 for controlling one or more torque generating devices 320, 340 on a heavy-duty vehicle 100. The method comprising:
- configuring Sa1 a primary sensor system 380 with a primary sensor control unit 220, 385,
- interpreting Sa2 an output signal 385 of the primary sensor system 380 by the primary sensor control unit 220, 385,
- configuring Sa3 one or more tire sensor devices 210 on one or more tires 120, 140, 160, 180 of the heavy-duty vehicle, 100 and a tire sensor control unit 350,
- interpreting Sa4 an output signal 355 of the one or more tire sensor devices 210 by the tire sensor control unit 350, and
- performing Sa5 motion control of the heavy-duty vehicle 100 based on output data of the tire sensor control unit 350 in case of malfunction in the primary sensor system 380 and/or in the primary sensor control unit 220, 385, and on output data of the primary sensor control unit 220, 385 otherwise.

Figure 6B:
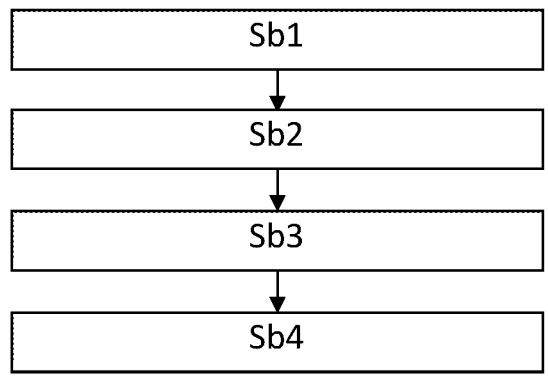

FIG. 6B is also a flow chart illustrating a method which summarizes some other parts of the techniques discussed above. There is illustrated a computer implemented method performed by a motion control system 300, 500 for controlling one or more torque generating devices 320, 340 on a heavy-duty vehicle 100. The method comprises
- configuring Sa1 a primary sensor system 380 with a primary sensor control unit 220, 385, interpreting Sa2 an output signal 385 of the primary sensor system 380 by the primary sensor control unit 220, 385,
- configuring Sa3 one or more tire sensor devices 210 on one or more tires 120, 140, 160, 180 of the heavy-duty vehicle 100 and a tire sensor control unit 350,
- interpreting Sa4 an output signal 355 of the one or more tire sensor devices 210 by the tire sensor control unit 350, and
- performing Sa5 motion control of the heavy-duty vehicle 100 based on output data of the tire sensor control unit 350 in case of malfunction in the primary sensor system 380 and/or in the primary sensor control unit 220, 385, and on output data of the primary sensor control unit 220, 385 otherwise.

Figure 7:
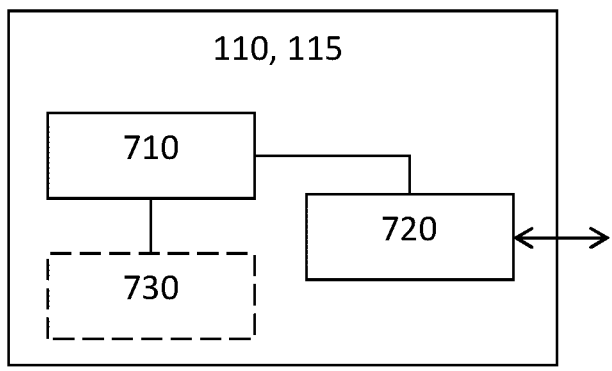
FIG. 7 schematically illustrates an example control unit.

FIG. 7 schematically illustrates, in terms of a number of functional units, the components of a control unit 110, 115 according to embodiments of the discussions herein. This control unit 110, 115 may be comprised in the vehicle 100, e.g., in the form of a VMM unit. Processing circuitry 710 is provided using any combination of one or more of a suitable central processing unit CPU, multiprocessor, microcontroller, digital signal processor DSP, etc., capable of executing software instructions stored in a computer program product, e.g., in the form of a storage medium 730. The processing circuitry 710 may further be provided as at least one application specific integrated circuit ASIC, or field programmable gate array FPGA.

Particularly, the processing circuitry 710 is configured to cause the control unit 110, 115 to perform a set of operations, or steps, such as the methods discussed in connection to FIGS. 6A and 6B. For example, the storage medium 730 may store the set of operations, and the processing circuitry 710 may be configured to retrieve the set of operations from the storage medium 730 to cause the control unit 110, 115 to perform the set of operations. The set of operations may be provided as a set of executable instructions. Thus, the processing circuitry 710 is thereby arranged to execute methods as herein disclosed.

The storage medium 730 may also comprise persistent storage, which, for example, can be any single one or combination of magnetic memory, optical memory, solid state memory or even remotely mounted memory.

The control unit 110, 115 may further comprise an interface 720 for communications with at least one external device such as a tire sensor. As such the interface 720 may comprise one or more transmitters and receivers, comprising analogue and digital components and a suitable number of ports for wireline or wireless communication.

The processing circuitry 710 controls the general operation of the control unit 110, 115, e.g., by sending data and control signals to the interface 720 and the storage medium 730, by receiving data and reports from the interface 720, and by retrieving data and instructions from the storage medium 730. Other components, as well as the related functionality, of the control node are omitted in order not to obscure the concepts presented herein.

Figure 8:
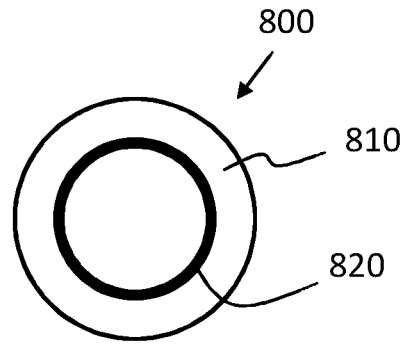
FIG. 8 shows an example computer program product.

FIG. 8 illustrates a computer readable medium 810 carrying a computer program comprising program code means 820 for performing the methods illustrated in FIG. 6 and the techniques discussed herein, when said program product is run on a computer. The computer readable medium and the code means may together form a computer program product 800.

The invention claimed is:

1. A motion control system for controlling one or more torque generating devices on a heavy-duty vehicle, the system comprising:
    a primary sensor system with a primary sensor control unit configured to interpret an output signal of the primary sensor system, and
    one or more tire sensor devices mounted on, in, or in connection to, one or more tires of the heavy-duty vehicle, and a tire sensor control unit configured to interpret an output signal of the one or more tire sensor devices,
    wherein the motion control system is arranged to base motion control of the heavy-duty vehicle on output data of the tire sensor control unit in case of malfunction in the primary sensor system and/or in the primary sensor control unit, and on output data of the primary sensor control unit otherwise.

2. The motion control system of claim 1, wherein the primary sensor system comprises one or more wheel speed sensors, where the primary sensor control unit is configured to perform an anti-lock braking system, ABS, function.

3. The motion control system of claim 1, wherein the primary sensor system comprises one or more wheel speed sensors, where the primary sensor control unit is configured to perform a traction control, ASR, function.

4. The motion control system of claim 1, wherein the one or more tire sensor devices comprises any of: an accelerometer, a strain gauge, and an optical sensor, wherein the output data of the tire sensor control unit comprises one or more wheel speeds.

5. The motion control system of claim 1, wherein the one or more tire sensor devices comprises a satellite positioning system receiver, wherein the output data of the tire sensor control unit comprises a vehicle speed over ground.

6. The motion control system of claim 5, wherein the output data of the tire sensor control unit comprises a wheel slip ratio associated with a wheel on the heavy-duty vehicle.

7. The motion control system of claim 1, wherein the primary sensor control unit is configured to control a primary valve system for brake control of the heavy-duty vehicle, wherein the tire sensor control unit is configured to control a secondary valve system for brake control of the heavy-duty vehicle separate from the primary valve system.

8. The motion control system of claim 1, wherein the tire sensor control unit is configured to interpret the output signals of the one or more tire sensor devices based on a machine learning algorithm.

9. The motion control system of claim 1, wherein the tire sensor control unit is configured to interpret the output signals of the one or more tire sensor devices based on a physics guided machine learning algorithm.

10. A vehicle comprising the motion control system of claim 1.

11. A computer implemented method performed by a motion control system for controlling one or more torque generating devices on a heavy-duty vehicle, the method comprising:

configuring a primary sensor system with a primary sensor control unit, interpreting an output signal of the primary sensor system by the primary sensor control unit, configuring one or more tire sensor devices on one or more tires of the heavy-duty vehicle and a tire sensor control unit, interpreting an output signal of the one or more tire sensor devices by the tire sensor control unit, and performing motion control of the heavy-duty vehicle based on output data of the tire sensor control unit in case of malfunction in the primary sensor system and/or in the primary sensor control unit, and on output data of the primary sensor control unit otherwise.

12. A computer program comprising program code means for performing the steps of claim 11 when the program is run on a computer or on processing circuitry of a control unit.

13. A computer readable medium carrying a computer program comprising program code means for performing the steps of claim 11 when the program product is run on a computer or on processing circuitry of a control unit.

* * * * *